United States Patent [19]

de Couasnon

[11] 4,380,068

[45] Apr. 12, 1983

[54] TEST UNIT FOR A HIGH-RATE MULTITRACK DIGITAL RECORDER

[75] Inventor: Tristan de Couasnon, Paris, France

[73] Assignee: Thomson-CSF, Paris, France

[21] Appl. No.: 226,025

[22] Filed: Jan. 19, 1981

[30] Foreign Application Priority Data

Jan. 22, 1980 [FR] France .................. 80 01326

[51] Int. Cl.³ .......................................... G01R 31/28
[52] U.S. Cl. .................................. 371/24; 324/212; 371/21; 371/25
[58] Field of Search ............... 371/24, 25, 21; 360/53; 324/210, 212

[56] References Cited

U.S. PATENT DOCUMENTS

| | | | |
|---|---|---|---|
| 3,096,511 | 7/1963 | Taras | 371/71 |
| 3,148,334 | 9/1964 | Danielsen et al. | 371/71 |
| 3,439,343 | 4/1969 | Stahle | 371/24 |
| 3,760,354 | 9/1973 | Ginn | 371/5 |
| 3,924,181 | 12/1975 | Alderson | 371/25 |
| 3,940,601 | 2/1976 | Henry et al. | 371/21 |
| 4,313,200 | 1/1982 | Nishiura | 371/25 |

OTHER PUBLICATIONS

Crawford et al., A High-Speed Pattern Generator and an Error Detector for Testing Digital Systems, Hewlett-Packard Journal, vol. 25, No. 3, pp. 16-24, Nov. 1973.

Primary Examiner—Charles E. Atkinson
Attorney, Agent, or Firm—Cushman, Darby & Cushman

[57] ABSTRACT

The unit for testing a plurality of tracks of a high-speed recorder in parallel comprises an emission subassembly for the transmission of data to the recorder to be tested and a test subassembly. The emission subassembly mainly comprises a generator for producing a pseudo-random or ramp-function sequence of binary numbers consisting of a plurality of binary elements in parallel. The test subassembly comprises a data storage device for storing the data reproduced by the tested recorder, a second generator programmed in the same manner as the first, a device for comparing the reproduced sequence with the emitted sequence and an error analysis device which delivers a measurement of the error rate and serves to locate the detected errors.

7 Claims, 3 Drawing Figures

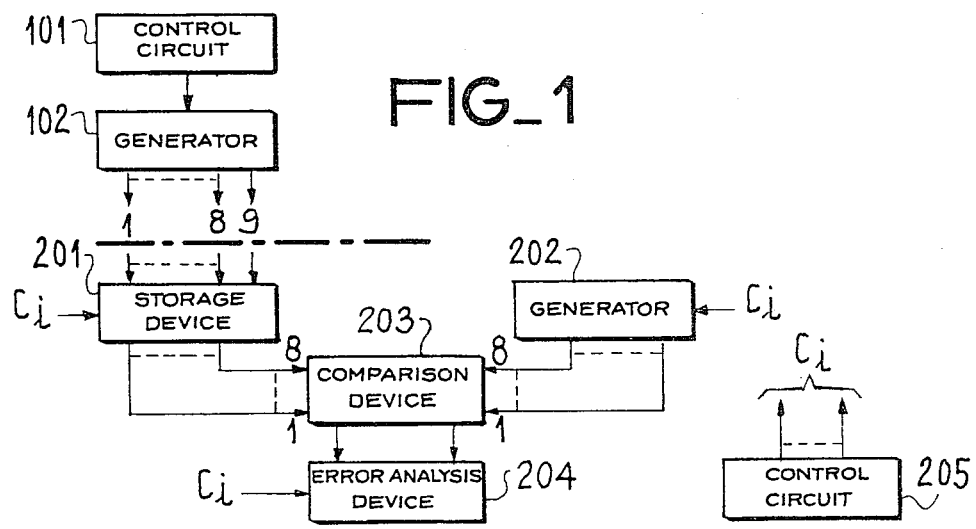
FIG_1
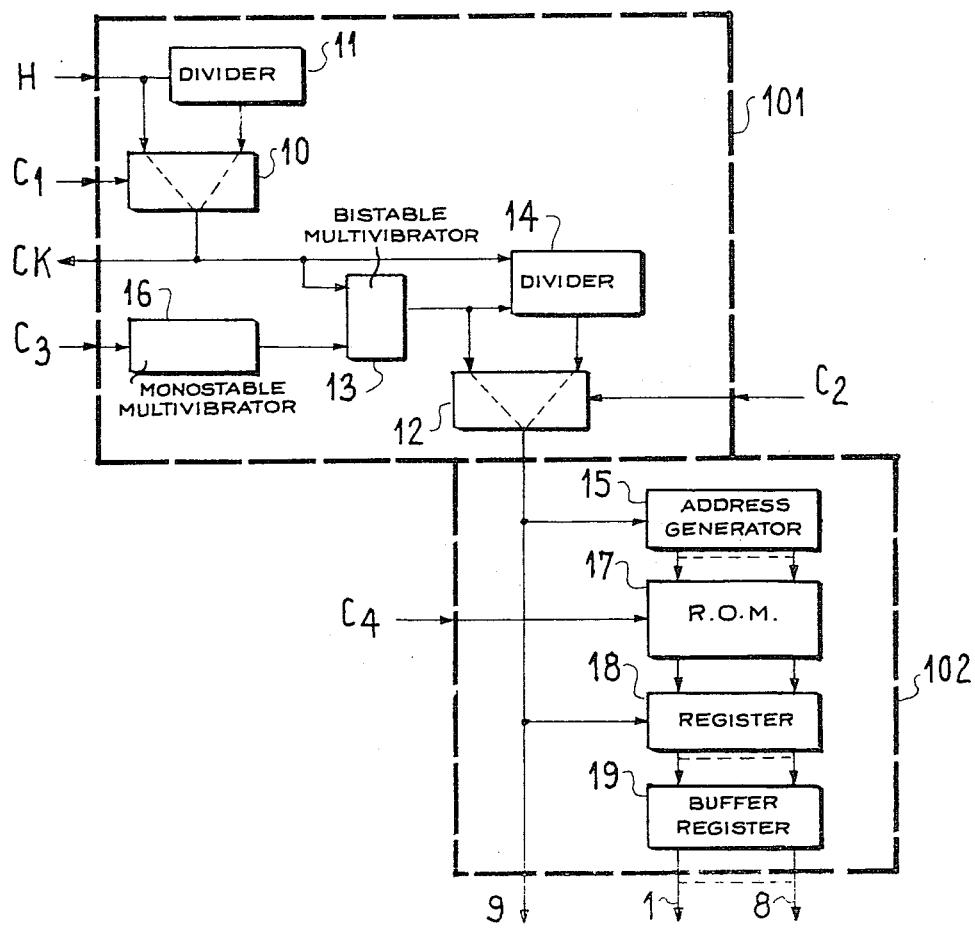
FIG_2

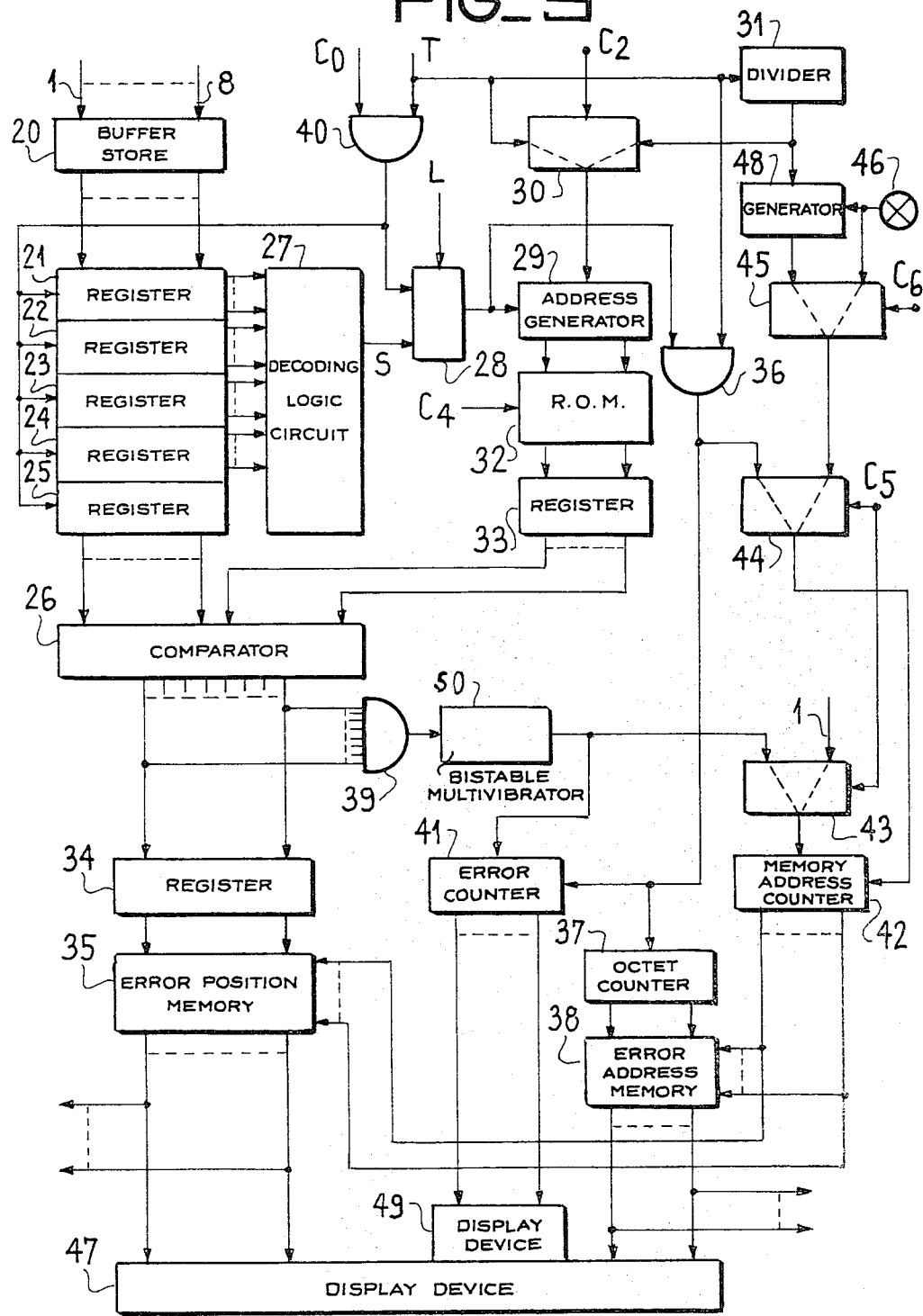

TEST UNIT FOR A HIGH-RATE MULTITRACK DIGITAL RECORDER

This invention relates to the digital recording field and is more particularly directed to a test unit for a high-rate multitrack digital recorder.

The devices employed at the present time for testing digital recorders transmit a pseudo-random sequence of binary elements to the recorder to be tested, this recording being performed on a single track. Reading of the binary elements thus recorded and comparison of the binary elements which are reproduced with the emitted pseudo-random sequence gives a value of the error rate introduced by the recorder. This method of measurement remains acceptable when the recorder is employed for track-by-track recording of series binary data but is not suitable when the recorder is employed on a number of tracks in parallel and at a high bit rate (106 M bits/s, for example). It is in fact necessary in this case to test all the tracks in parallel in order to obtain a significant measurement of the error rate by means of a recording and reading operation which reproduces the conditions of utilization. Moreover, testing devices of this type produce a general measurement of the error rate but provide no means of interpreting this measurement. For example, devices of this type do not make it possible to detect whether the errors detected are isolated errors or on the contrary grouped errors and at which points of the magnetic recording tape such errors are located.

Moreover, as mentioned above, the test sequences employed in conventional testing devices are pseudo-random sequences, which normally produces a correct value of the error rate. However, in the case of certain types of recorders, other sequences may give rise to a higher detected error rate; this may be the case when the type of code employed by the recorder exhibits a particular weakness such as, for example, a binary configuration in which a single bit is changed at each recording: this may constitute a more unfavorable case for the recorder than a configuration which varies in a random manner. Moreover, the code used by the recorder may be sensitive to monotony of data, a relevant example being the Miller-Carré code. On this assumption, the most unfavorable test in which the recorder may be required to operate is the recording of a continuous sequence which varies slowly with time.

Finally, in conventional testing devices, synchronization is carried out by means of a clock signal generated from the binary elements received. In some types of codes (and this is again the case with the Miller-Carré code), generation of the clock signal from the binary elements received may give rise to difficulty.

The invention is primarily directed to a test unit having a higher performance which makes it possible to test all the tracks of a multitrack digital recorder in parallel in order to provide a general measurement of the error rate. the unit comprises a device for analyzing detected errors and determining the location of said errors on the recorded tape.

In accordance with the invention, the test unit for a high-rate multitrack digital recorder is mainly distinguished by the fact that it comprises a first generator for producing a sequence of binary numbers and connected to a multiple emission output for transmitting data to the recorder to be tested, a data storage device connected to a multiple input of said test unit for storing the data reproduced by the tested recorder, a second generator for producing the same sequence of binary numbers, a device for comparing the reproduced sequence with the emitted sequence, said comparison device being connected on the one hand to the output of the storage device and on the other hand to the output of the second generator, and an error analysis device connected to the output of the comparison device for counting the errors introduced by the recorder to be tested and detected by the comparison device.

Complementary devices may be incorporated in the test unit for the purpose of overcoming the disadvantages of conventional devices and producing a test sequence corresponding to the most unfavorable cases of utilization of the recorder.

Other features of the invention will be more apparent upon consideration of the following description and accompanying drawings, wherein:

FIG. 1 is a block diagram of the test unit;

FIG. 2 illustrates one embodiment of the emission subassembly of the test unit in accordance with the invention;

FIG. 3 illustrates the test subassembly proper of one embodiment of the test unit in accordance with the invention.

In the block diagram of FIG. 1, the test unit in accordance with the invention is composed of two subassemblies: an emission subassembly for transmitting data to the recorder to be tested and a second subassembly which is more particularly intended to carry out the test proper on the basis of data which are re-read by the recorder and transmitted to the test unit.

The emission subassembly mainly comprises a control circuit 101 associated with a generator 102 for producing a psuedo-random or ramp-function sequence of binary numbers, each number being formed by a plurality of binary elements in parallel as designated by way of example by the reference numerals 1–8. The test subassembly comprises a data storage device 201 for storing the data reproduced by the tested recorder, a second generator 202 which is programmed in the same manner as the generator 102, a comparison device 203 for comparing the reproduced sequence with the emitted sequence and an error analysis device 204 which delivers a measurement of the error rate and serves to locate detected errors, these devices being controlled by a control circuit 205.

The emission subassembly of the test unit is shown in detail in FIG. 2. The control circuit 101 comprises a clock input H connected on the one hand to one signal input of a selector 10 and on the other hand to the input of a divider 11 for dividing the frequency of the clock signal by n (64, for example). The output of the divider 11 is connected to the second signal input of the selector 10.

The selector has a speed conrol input $C_1$ which serves to select either of the two signals received by the selector according to the speed at which it is desired to record the data: high speed (clock signal H) or low speed (clock signal divided by n). The output of the selector 10 which delivers a clock signal CK is connected on the one hand to a first input of a second selector 12 via a bistable multivibrator 13 and on the other hand to one input of a divider circuit 14 for dividing the frequency of the signal received on said input by m (m=16, for example).

The output of said divider circuit is connected to the second signal input of the selector 12 which selects the emission mode of the device: sequential mode in which the 8-bit bytes or octets of the sequence are emitted successively, or repetitive mode in which each octet of the sequence is emitted m times.

The second input of the bistable multivibrator 13 is connected to the emission control input $C_3$ of the test unit via a monostable multivibrator 16. In fact, in order to obtain good synchronization for the comparison, one and the same octet is recorded during a period of time of sufficient duration (10 s, for example) corresponding to the steady-level stage introduced by the monostable multivibrator 16. The output of said bistable multivibrator 13 is also connected to a forcing input of the divider circuit 14. Thus, during the steady-level time interval, the output of the divider circuit 14 does not change state.

The mode control input $C_2$ of the selector 12 serves to select the control signal applied to a sequence generator 102. The sequence generator mainly comprises an address generator 15 associated with a R.O.M. memory 17 in which a sequence of binary numbers has been recorded. Depending on the state of the control signal $C_2$, the address generator is incremented at each pulse of the clock signal CK or only at intervals of one pulse out of m, outside the steady-level stage introduced at the beginning of the operation. Thus, the data stored in memory at an address which is determined by the address generator will be emitted either once or repeated m times except during the steady-level stage in which the address generator is at zero.

In order to test the recorder under different operating conditions, the recorded sequence consists of two series of binary numbers: a pseudo-random series and a series which varies continuously so that only one binary element changes at each step of the progression of the address generator. By way of example, the memory can have a capacity of $2^9$ octets and comprise a first pseudo-random series of 256 octets and a second series of 256 octets in a ramp-function monotonic progression. The memory 17 has a control input $C_4$ for the selection of either of these two series. During operation of the test unit in the emission mode, the memory feedback period is the period of a series of 256 octets. In other words, one and the same pseudo-random or ramp-function series is emitted in order to be recorded as long as operation in the emission mode has not been stopped. This stopping control is obtained on the second position of the control switch $C_3$.

Synchronization of the device is obtained by detection of the end of a steady-level stage. With this objective, the address generator is not incremented at the time of startup by reason of the steady-level stage which has been generated. In consequence, the same octet which is present at the address 0 in the memory will be emitted throughout the duration of the steady-level stage. Moreover, the two series recorded in the dead memory are such that the octets recorded at the first three addresses of each series are the same for both series, the first being an octet of 0 in both cases. Synchronization may thus be obtained from the received data and not from a reconstituted clock signal.

The multiple output of the programmed memory 17 is connected to an output register 18, one clock input of which receives the output signal of the selector 12. The data outputs of said output register are connected to the inputs of a buffer storage register 19, the inputs of which are connected to the data output terminals 1 to 8 of the test unit. A clock output terminal 9 to be connected to the recorder to be tested with the data outputs receives the output signal of the selector 12 for initiating the recording operation.

FIG. 3 illustrates the test subassembly of the unit in accordance with the invention. This subassembly has eight data input terminals and one clock input terminal T to be connected to the data-reading output terminals and clock output terminal of the recorder to be tested. The multiple data input is connected to a buffer store 20, the multiple output (eight terminals) of which is connected to the multiple input of a stack of registers consisting of five registers 21, 22, 23, 24 and 25. The multiple output of the last register of the stack is connected to a first multiple input of a comparator 26.

The clock input terminal T is connected to the first input of an AND-gate 40, the second input of which is connected to the startup control terminal $C_o$ of the test unit. The output terminal of AND-gate 40 is connected to the clock inputs of the registers 21 to 25; the output signal of the gate controls the transfer of data from one register to the next at the same output rate as the octets of the recorder. The outputs of the four first registers of the stack are connected to the inputs of a decoding logic circuit 27, the output of which delivers a synchronization signal S when a predetermined series of four octets corresponding to the beginning of a sequence is detected. By way of example, this sequence can be two octets formed by 0 corresponding to the end of the steady-level synchronization stage within the registers 24 and 23 and by the first and second similar octets of the two recorded series which are present respectively on the outputs of registers 22 and 21. The synchronization signal S is applied to the first input of a bistable multivibrator 28, the second input of which is connected to the output of the gate 40.

In addition, the test unit has a synchronization input L which is to be connected to a corresponding output of the recorder and which is connected to the clock input of the bistable multivibrator 28. When the sequence of four octets corresponding to a start of sequence is detected, the bistable multivibrator 28 delivers a synchronization signal to a second address generator 29. The signal starts the operation of the generator from the first address of the pseudo-random or ramp-function series which has been selected as before. The address generator also receives an advance control signal which, as in the emission subassembly, is either the clock signal T if the octet to be generated changes at each step of the clock signal, or the clock signal divided by m if the same octet has been repeated m times during recording in order that it should also be repeated during testing. To this end, the clock input T is connected to a first input of a selector 30 and also to the signal input of a scale-of-m divider 31, the output of said divider being connected to the second input of the selector 30. One control input of said selector receives the same control signal $C_2$.

The output of the address generator is connected to the addressing input of a second R.O.M. memory 32 which is similar to the first and programmed in the same manner, that is, with a first pseudo-random series of binary numbers and a second ramp-function series having the same octets at the same addresses. The memory 32 is provided as in the case of the first memory with a control input $C_4$ for controlling the emission of either of these two series. The multiple output of the memory 32 is connected to the input of an output register 33, the multiple output of which is connected to the second multiple input of the comparator 26.

The comparison is carried out binary element by binary element; the comparator delivers at each of its eight outputs corresponding to the eight binary elements of the octet either a 0 or a 1, depending on whether said binary elements are identical or not. The error analysis device comprises an eight-stage output register 34 connected to the eight outputs of the comparator and therefore makes it possible to locate the error or errors in the octet.

Moreover, the outputs of the comparator 26 are connected to the inputs of an AND-gate 39, the output of which is connected to the input of a bistable multivibrator 50. The bistable multivibrator delivers one pulse for each octet in which one or a number of errors have been detected. The output of said multivibrator is connected to the signal input of an error counter 41 which also has a clock input connected to the output of the AND-gate 36. The counter 41 therefore indicates in real time the total number of errors detected. The outputs of the counter are connected to a display device 49.

Moreover, optimum utilization of test results by this analyzing device is ensured by storing the order, in the sequence, of the octet in which an error has been detected while storing at the same time the contents of the register 34 which give the position of the error in the octet. To this end, the counting input of an octet counter 37 is connected to the output of the AND-gate 36. The contents of the counter therefore indicate in real time the order of the octet in the sequence of octets delivered by the programmed memory 32. An error address memory 38 is associated with octet counter 37 and an error position memory 35 is associated with the register 34. Transfer of the contents of the register 34 into the memory 35 and transfer of the contents of the octet counter 37 into the memory 38 are carried out in real time when an error is detected in the octet under analysis. To this end, the output of the bistable device 50 is also coupled to the input of a memory address counter 42, the contents of which are increased at each detected error and the multiple output of which indicates the memory address at which are recorded on the one hand the position of the error (in the memory 35) and on the other hand the order of the octet in which said error has been detected (in the memory 38).

Coupling of the output of the bistable device 50 to the counting input of the counter 42 is carried out by means of a selector 43 having a second signal input which receives a constant-level signal (1) and a selection control input $C_5$. The memory address register 42 also has a clock input. The clock input is connected to the output of a selector 44 having a first signal input connected to the output of the AND-gate 36 (the output signal of said gate determines the rate of the sequence generated during the test operation proper) and a second signal input for receiving a signal which determines the data output rate of the memory. The selector 44 has a test-/display control input $C_5$. Throughout the duration of the test, the counting input of the memory address counter 42 is connected to the output of the bistable device 50 and therefore receives advance pulses at each error. The signal input of the selector 43 which receives the constant-level signal is employed for examination in delayed time. In the embodiment which is specifically illustrated in FIG. 3, examination in delayed time may be performed in two different ways:

in step-by-step sequence while visualizing for each erroneous octet the contents of the memories 37 and 38 at the corresponding address by display on a visualization device 47 which forms part of the test unit, by displaying the contents of memories 35 and 38 in blocks corresponding to a certain number of errors (256 errors, for example), a multiple output terminal connected to the memories being provided for displaying these data on a logical state analyzer located externally of the test unit.

For examination in delayed time, the memory address at which the octet representing the result of the test and the address of the erroneous octet in the sequence are stored respectively is selected within the memory address counter 42. To this end, the clock input of the memory address counter receives via the second signal input of the selector 44 a signal which provides the output rate of the data of the memories 35 and 38.

A selector 45 has a control input $C_6$ which makes it possible to choose the mode of display, namely either step-by-step or in blocks. The input of said selector which corresponds to step-by-step display is connected to a pushbutton 46 so that each application of pressure initiates the emission of a pulse which produces incrementation of the memory address register. At the time of change-over of the selectors 43 and 44 by means of the control $C_5$ for transition from testing to display, the memory address register is reset to 0. The display device 47 connected to the data outputs of the memories 35 and 38 serves to display the address of the first error and to locate the binary elements concerned. Each application of pressure on the pushbutton permits a one-step advance within the memory. An examination of this type is carried out when the number of errors detected is fairly small.

In the case of a large number of detected errors, the selector 45 is placed in the "block" visual display position. In this mode, the output of a pulse generator 48 which receives a clock signal consisting of the output signal of the divider 31, for example, is connected to the second input of the selector 45. If the visual display is carried out in blocks of 256 errors, 256 pulses will be emitted for the advance of the memory address register. The data outputs of the memories 35 and 38 are then connected to a logical state analyzer which is external to the test unit itself. The generator 48 has a startup control input which is also connected to the pushbutton 46. In this mode of display, each application of pressure on said pushbutton initiates reading of a certain number of consecutively stored errors and capture of said errors by the logical state analyzer. The operator can examine the contents of the memories on the screen of the analyzer: when the addresses of the errors detected in the sequence follow each other, it is an easy matter to detect grouped errors or so-called error bursts which may relate to the same binary element in the different octets or to different binary elements. It is also any easy matter to detect isolated errors.

In order to simplify the figures, the zero-reset control inputs of the different registers and counters have not been illustrated and the same applies to the supply inputs of the different logic circuits employed.

The invention is not limited to the embodiment specifically described in the foregoing with reference to the accompanying drawings. In particular, the device hereinabove described makes it possible to test a maximum of eight tracks in parallel but this arrangement is clearly not given in any limiting sense. Furthermore, the improvement in regard to synchronization by introduction of a steady-level stage prior to recording of the test sequence is highly advantageous in certain instances but it would nevertheless not constitute any departure from the scope of the invention to replace this improvement by a synchronization device which utilizes the beginning of a data sequence.

By way of example, the error counter 41 can have a capacity of $2^{12}$ (4096), which corresponds to a maximum error rate of $10^{-6}$ in respect of five minutes of high-speed recording whilst the position memory has a corresponding capacity: $2^{12} \times 8$ and the memories 38 and 42 have matched capacities.

What is claimed is:

1. A test unit for a high-rate multitrack digital recorder, said unit having a multiple input and output and comprising:
   a first generator for producing a sequence of binary numbers and connected to said multiple output for transmitting data to the recorder to be tested;
   a data storage means connected to said multiple input of said test unit for storing the data reproduced by the tested recorder;
   a second generator for producing the same sequence of binary numbers;
   means for comparing the reproduced sequence with the emitted sequence, said comparing means being connected to the output of the storage means to the output of the second generator;
   an error analysis means connected to the output of the comparison means for counting the errors introduced by the recorder to be tested and detected by the comparing means; and
   said error analysis means including a first counter for counting detected errors and means for locating detected errors, said error locating means including a second counter for counting reproduced binary numbers and delivering at each instant the address of the binary number analyzed in the sequence and a storage memory means connected to said comparing means and to said second counter and having a control input for causing storage of addresses of binary numbers in which errors are detected and the position of the detected errors in each erroneous number.

2. A test unit for a high-rate multitrack digital recorder, said unit having a multiple input and output and comprising:
   a first generator for producing a sequence of binary numbers and connected to said multiple output for transmitting data to the recorder to be tested;
   a data storage means connected to said multiple input of said test unit for storing the data reproduced by the tested recorder;
   a second generator for producing the same sequence of binary numbers;
   means for comparing the reproduced sequence with the emitted sequence, said comparing means being connected to the output of the storage means and to the output of the second generator; and
   an error analysis means connected to the output of the comparing means for counting the errors introduced by the recorder to be tested and detected by the comparing means;
   said storage means comprising a stack of memory registers for storing a plurality of successive binary numbers of the reproduced sequence, and a decoding logic means connected to the outputs of the memory registers, a synchronization signal being delivered by one output of said decoding means to the second generator and the comparing means for a predetermined succession of numbers identified as the beginning of a sequence.

3. A test unit according to claim 1 or claim 2, wherein the first and second sequence generators each have a programmed memory with a pseudo-random series of binary numbers.

4. A test unit according to claim 1 or claim 2, wherein the first and second sequence generators each have a programmed memory with a pseudo-random series and a continuous series of binary numbers, the test unit being provided with a control input connected to the two generators aforesaid for selecting either of these two series.

5. A test unit according to claim 1, wherein the two generators have two operating modes, namely a sequential mode in which the binary numbers of the sequence are emitted successively and a repetitive mode in which the binary numbers of the sequence are emitted several times in succession, the test unit being provided with a mode-control input.

6. A test unit according to claim 1, wherein said unit further comprises a display device coupled to the detected-error counter and to the storage memory.

7. A test unit according to claim 1, wherein said unit has a multiple analysis output connected on the one hand to the error counter and on the other hand to the storage memory, said multiple output being intended to be connected to a logical state analyzer.

* * * * *